(12) United States Patent
Gomes et al.

(10) Patent No.: US 10,531,202 B1
(45) Date of Patent: Jan. 7, 2020

(54) REDUCED THICKNESS ACTUATOR

(71) Applicant: Google LLC, Mountain View, CA (US)

(72) Inventors: Rajiv Bernard Gomes, San Jose, CA (US); Mark William Starnes, Sunnyvale, CA (US); Anthony King, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/101,941

(22) Filed: Aug. 13, 2018

(51) Int. Cl.
| | | |
|---|---|---|
| *H04R 11/00* | (2006.01) | |
| *H04R 9/06* | (2006.01) | |
| *H02K 41/035* | (2006.01) | |
| *H04R 1/02* | (2006.01) | |
| *H04R 7/18* | (2006.01) | |
| *H04R 9/02* | (2006.01) | |

(52) U.S. Cl.
CPC ............ *H04R 9/06* (2013.01); *H02K 41/0356* (2013.01); *H04R 1/028* (2013.01); *H04R 7/18* (2013.01); *H04R 9/025* (2013.01); *H04R 2499/11* (2013.01); *H04R 2499/15* (2013.01)

(58) Field of Classification Search
CPC .. H04R 9/025; H04R 2209/024; H04R 9/043; H04R 2307/207; H04R 2400/07; B06B 1/045
USPC .......................... 381/400–401, 412, 419–421
See application file for complete search history.

(56) References Cited

U.S. PATENT DOCUMENTS

| | | |
|---|---|---|
| 8,682,009 B2 | 3/2014 | Barroun et al. |
| 2009/0184589 A1 | 7/2009 | Yamagishi |
| 2011/0299703 A1 | 12/2011 | Annamaa et al. |
| 2014/0369547 A1 | 12/2014 | Qingshan |

FOREIGN PATENT DOCUMENTS

| | | |
|---|---|---|
| JP | 2002336786 | 11/2002 |
| WO | WO 2012/047653 | 4/2012 |

OTHER PUBLICATIONS

PCT Invitation to Pay Additional Fees in International Appln. No. PCT/GB2019/052118, dated Oct. 4, 2019. 30 pages.

*Primary Examiner* — George C Monikang
(74) *Attorney, Agent, or Firm* — Fish & Richardson P.C.

(57) ABSTRACT

In some implementations, an actuator can include a magnetic cup comprising a base and sidewalls defining a cavity, the base comprising a planar outer surface opposite the cavity, an edge of the outer surface comprising one or more joint elements; a magnet arranged in the cavity of the magnetic cup; a voice coil arranged in an air gap separating the sidewalls and the magnet; a support comprising one or more magnetic suspension members each comprising an edge shaped to fit to a corresponding one of the joint elements and having a first side that is a) flush with the planar outer surface or b) displaced from the planar outer surface along a first axis perpendicular to the planar outer surface in a direction toward the cavity of the magnetic cup; and a coupling plate attached to the voice coil and the support.

20 Claims, 5 Drawing Sheets

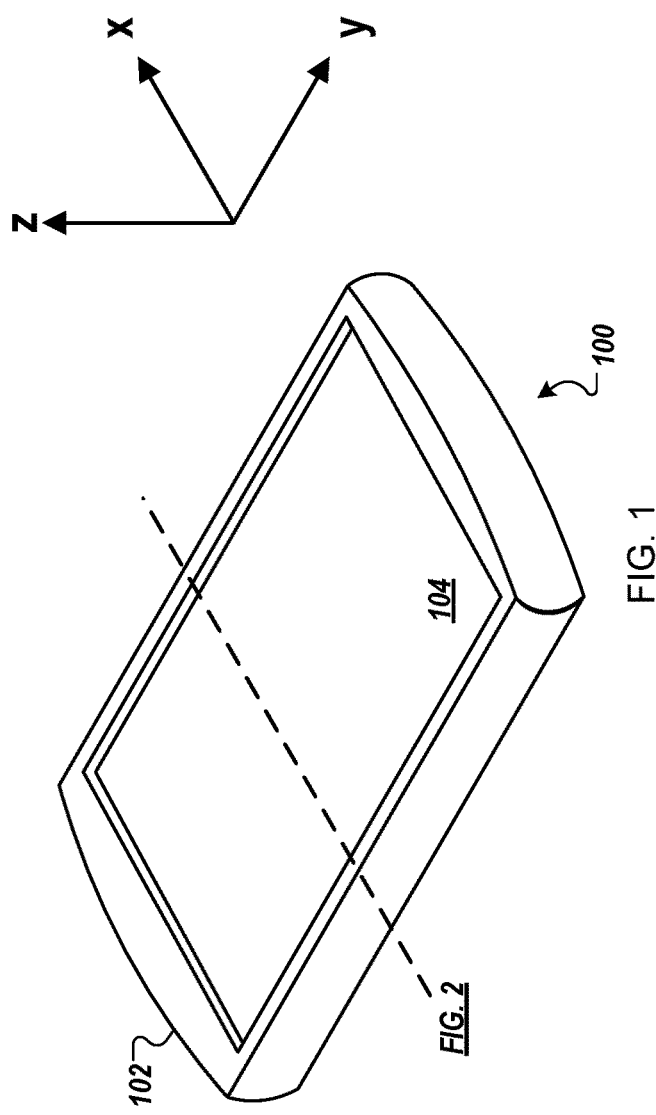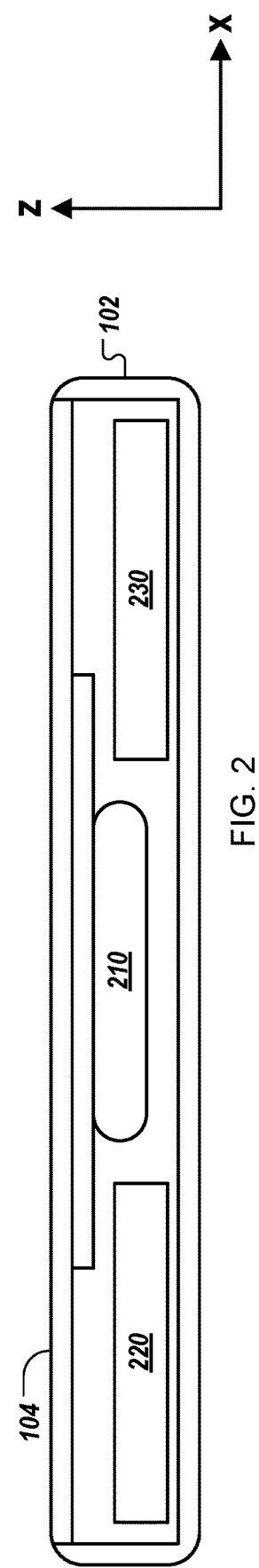

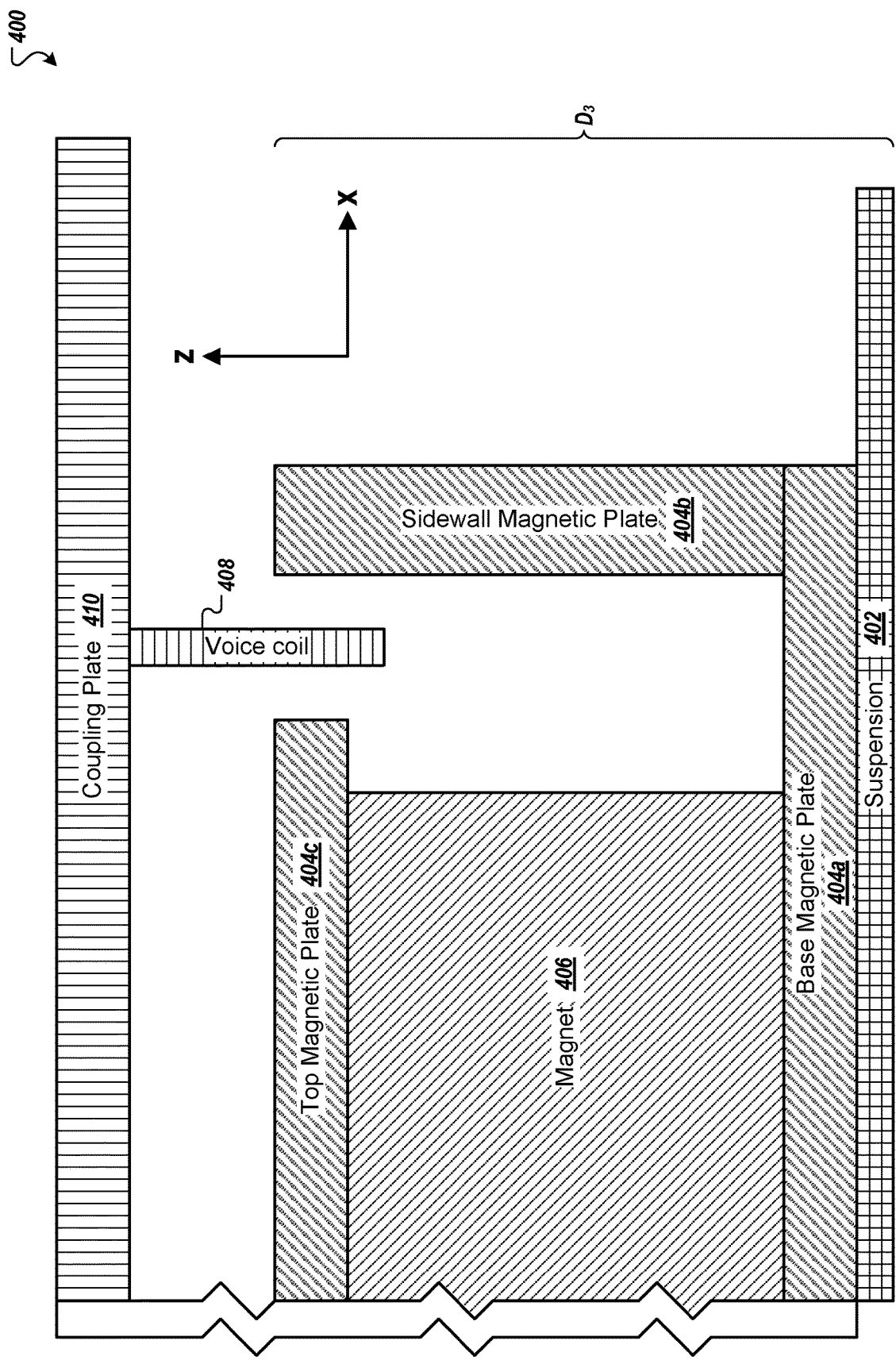

REDUCED THICKNESS ACTUATOR

BACKGROUND

Some conventional loudspeakers produce sound by inducing piston-like motion in a diaphragm. Panel audio loudspeakers, such as distributed mode loudspeakers (DMLs), in contrast, operate by inducing uniformly distributed vibration modes in a panel through an electro-acoustic actuator. The actuators can be electromagnetic or piezoelectric actuators.

SUMMARY

An actuator, e.g., used to generate sound, may include a suspension that is part of a magnetic cup to reduce a depth of the actuator. The magnetic cup may include a base that is connected to, and part of, the suspension so that the suspension does not extend below the base of the magnetic cup.

The magnetic cup may include one or more joint elements (e.g., a rabbet or a chamfered, scalloped, or filleted edge) at the edge of the base into which the suspension fits. Portions of the suspension may be welded to the joint element to secure the suspension to the magnetic cup.

The suspension is made from a magnetic material, e.g., a soft magnetic material, such as low carbon steel or cold rolled steel. The suspension may be part of a magnetic circuit that includes the magnetic cup, and a magnet and a voice coil located inside the magnetic cup, to compensate for material not included in the magnetic cup because of cavities defined by the joint elements and to allow the actuator to generate sound.

Embodiment 1 is an actuator comprising: a magnetic cup comprising a base and sidewalls defining a cavity, the base comprising a planar outer surface opposite the cavity, an edge of the outer surface comprising one or more joint elements; a magnet arranged in the cavity of the magnetic cup and separated from the sidewalls by an air gap; a voice coil arranged in the air gap separating the sidewalls of the magnetic cup and the magnet; a support comprising one or more magnetic suspension members each comprising an edge shaped to fit to a corresponding one of the one or more joint elements to connect the support to the magnetic cup, each of the one or more magnetic suspension members having a first side that is a) flush with the planar outer surface of the magnetic cup or b) displaced from the planar outer surface of the base of the magnetic cup along a first axis perpendicular to the planar outer surface in a direction toward the cavity of the magnetic cup; and a coupling plate attached to the voice coil and the support.

Embodiment 2 is the actuator of embodiment 1, wherein: the magnetic cup has a depth along the first axis of 3.5 millimeters or less.

Embodiment 3 is the actuator of any one of embodiments 1 or 2, wherein: each of the joint elements has a depth along the first axis of 200 microns or less.

Embodiment 4 is the actuator of any one of embodiments 1 through 3, wherein: each of the joint elements has a dimension orthogonal to the first axis of 200 microns or less.

Embodiment 5 is the actuator of any one of embodiments 1 through 4, wherein: the joint elements are rabbets.

Embodiment 6 is the actuator of embodiment 8, wherein: each of the rabbets have a rectangular shape or a square shape.

Embodiment 7 is the actuator of any one of embodiments 1 through 4, wherein: each of the joint elements are a chamfered edge, a scalloped edge, or a filleted edge.

Embodiment 8 is the actuator of any one of embodiments 1 through 7, wherein: the one or more joint elements comprises a single continuous edge feature along the edge of the planar outer surface of the base of the magnetic cup.

Embodiment 9 is the actuator of any one of embodiments 1 through 8, wherein: the one or more joint elements comprise two or more discrete joint elements.

Embodiment 10 is the actuator of any one of embodiments 1 through 9, wherein: each of the one or more magnetic suspension members is welded to the magnetic cup at the corresponding joint element.

Embodiment 11 is the actuator of any one of embodiments 1 through 10, wherein: each of the one or more magnetic suspension members has a relative permeability between 100 and 20,000.

Embodiment 12 is the actuator of any one of embodiments 1 through 11, wherein: each of the one or more magnetic suspension members has a Young's modulus between 100 gigapascals and 250 gigapascals.

Embodiment 13 is the actuator of any one of embodiments 1 through 12, wherein: each of the one or more magnetic suspension members is low carbon steel.

Embodiment 14 is the actuator of any one of embodiments 1 through 12, wherein: each of the one or more magnetic suspension members is cold rolled steel.

Embodiment 15 is the actuator of any one of embodiments 1 through 14, wherein: the support comprises a support sidewall that connects the plurality of suspension members to the coupling plate.

Embodiment 16 is the actuator of embodiment 15, wherein: the support sidewall is a material with magnetic properties.

Embodiment 17 is the actuator of any one of embodiments 15 through 16, wherein: the support sidewall is iron.

Embodiment 18 is the actuator of any one of embodiments 1 through 17, wherein: the magnet cup is a soft magnetic material.

Embodiment 19 is a mobile device comprising: an electronic display panel extending in a plane; a chassis attached to the electronic display panel and defining a space between a back panel of the chassis and the electronic display panel; an electronic control module housed in the space, the electronic control module comprising a processor; and an actuator of any of embodiments 1 through 18 housed in the space and attached to a surface of the electronic display panel.

Embodiment 20 is a wearable device comprising: an electronic display panel extending in a plane; a chassis attached to the electronic display panel and defining a space between a back panel of the chassis and the electronic display panel; an electronic control module housed in the space, the electronic control module comprising a processor; and an actuator of any of embodiments 1 through 18 housed in the space and attached to a surface of the electronic display panel.

Among other advantages, embodiments feature a reduced depth actuator, e.g., transducer, that requires less space in another device, such as a mobile phone. An actuator that requires less space, e.g., volume, may be used in smaller devices, in devices that includes more components, or both. In some implementations, a device that includes an actuator as described in this document, e.g., with a merged magnetic cup and support, may have a reduced weight. A reduced weight may improve device reliability during an impact with a surface, e.g., when the device is dropped the device may be less likely to become damaged, may sustain less damage, or both. In some implementations, an actuator as described in this document, e.g., with a merged magnetic cup and support, may have better thermal stability compared to other actuators. In some implementations, a system that manufactures the actuator described in this document may reduce materials necessary to manufacture the actuator, may reduce manufacturing time, or both. In some examples, a system may be able to manufacture a magnetic cup and suspension out of one piece of material.

Other advantages will be evident from the description, drawings, and claims.

BRIEF DESCRIPTION OF THE DRAWINGS

FIG. 1 is a perspective view of an embodiment of a mobile device.

FIG. 2 is a schematic cross-sectional view of the mobile device of FIG. 1.

FIG. 4 depicts a side view of another actuator with a suspension that extends below a magnetic cup.

Like reference numbers and designations in the various drawings indicate like elements.

DETAILED DESCRIPTION

Figure 3A:
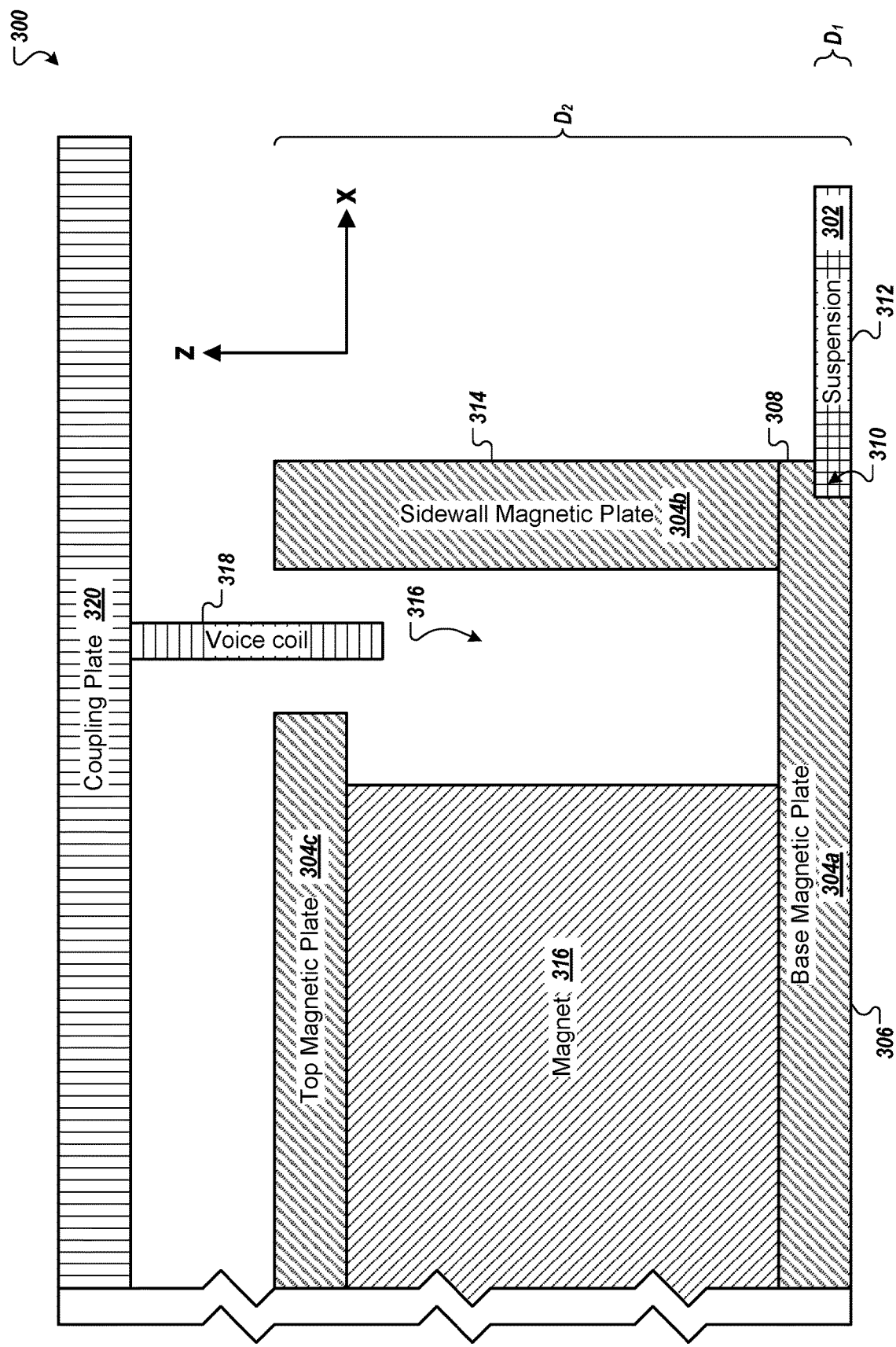
FIG. 3A depicts a cross-section of a portion of an actuator with a suspension included in a base magnetic plate of the actuator.

This disclosure features actuators for panel audio loudspeakers, such as distributed mode loudspeakers (DMLs). Such loudspeakers can be integrated into a mobile device, such as a mobile phone. For example, referring to FIG. 1, a mobile device 100 includes a device chassis 102 and a touch panel display 104 including a flat panel display (e.g., an OLED or LCD display panel) that integrates a panel audio loudspeaker. The mobile device 100 interfaces with a user in a variety of ways, including by displaying images and receiving touch input via touch panel display 104. Typically, a mobile device has a depth of approximately 10 mm or less along the z-axis, a width of 60 mm to 80 mm (e.g., 68 mm to 72 mm) along the x-axis, and a height of 100 mm to 160 mm (e.g., 138 mm to 144 mm) along the y-axis.

The mobile device 100 also produces audio output. The audio output is generated using a panel audio loudspeaker that creates sound by causing the flat panel display to vibrate. The touch panel display 104 is coupled to an actuator, such as a distributed mode actuator, or DMA. The actuator is a movable component arranged to provide a force to a panel, such as touch panel display 104, causing the panel to vibrate. The vibrating panel generates human-audible sound waves, e.g., in the range of 20 Hz to 20 kHz.

In addition to producing sound output, mobile device 100 can also produce haptic output using the actuator. For example, the haptic output can correspond to vibrations in the range of 180 Hz to 300 Hz.

FIG. 1 also shows a dashed line that corresponds to the cross-sectional direction shown in FIG. 2. Referring to FIG. 2, a cross-section 200 of mobile device 100 illustrates device chassis 102 and touch panel display 104. FIG. 2 includes a Cartesian coordinate system with X, Y, and Z axes, for ease of reference. Device chassis 102 has a depth measured along the Z-direction and a width measured along the X-direction. Device chassis 102 also has a back panel, which is formed by the portion of device chassis 102 that extends primarily in the X-Y-plane. Mobile device 100 includes an electromagnet actuator 210, which is housed behind the touch panel display 104 in the device chassis 102 and affixed to the backside of touch panel display 104. Generally, electromagnet actuator 210 is sized to fit within a volume constrained by other components housed in the chassis, including an electronic control module 220, described in more detail below, and a battery 230.

Figure 3B:
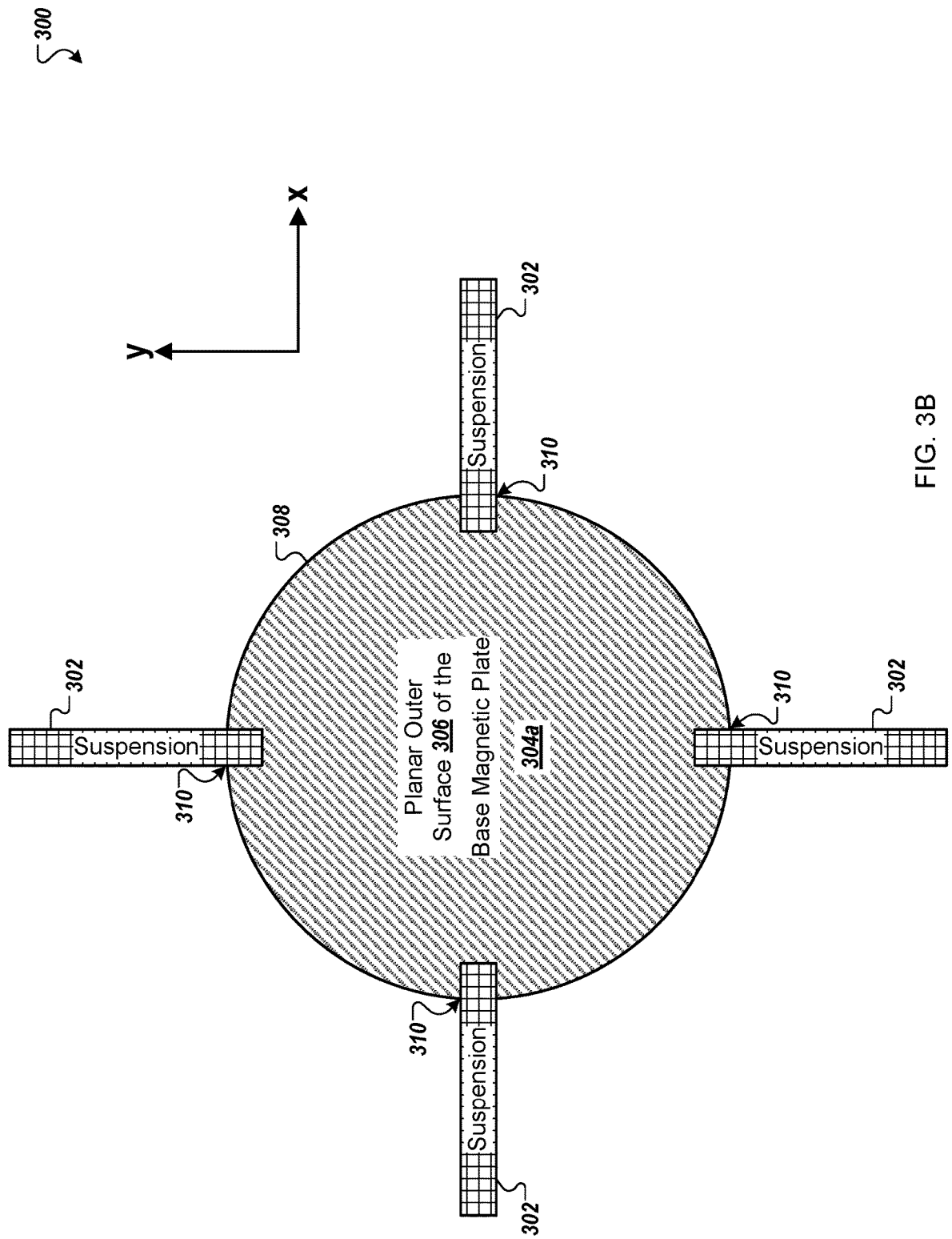
FIG. 3B depicts a bottom view of the actuator 300 with discrete rotational symmetry around an axis parallel to the Z-axis.

FIG. 3A depicts a cross-section of a portion of an actuator 300, e.g., the electromagnet actuator 210. The actuator 300 is generally rotationally, e.g., continuously or discretely, symmetric about a symmetry axis parallel to the Z-axis. FIG. 3B depicts a bottom view of the actuator 300 with discrete rotational symmetry around an axis parallel to the Z-axis, e.g., that runs through the center of the base magnetic plate 304a. For instance, the actuator 300 includes four suspension elements 302 that connect to discrete portions of a base magnetic plate 304a. In some implementations, as discussed in more detail below, the actuator 300 may have continuous rotational symmetry, e.g., with a single suspension element 302 that surrounds the actuator 300.

As shown in FIG. 3A, the actuator 300 includes the suspension 302 in a portion of the base magnetic plate 304a of the actuator 300. Incorporating the suspension 302 into the base magnetic plate 304a reduces a depth of the actuator 300, e.g., along the Z-axis, and may reduce the processing material, processing time, or both, necessary to manufacture the actuator 300. In some examples, a mobile device may include the actuator 300 to generate sound, haptic feedback, or both. Other types of devices may also use the actuator 300 to generate sound, haptic feedback, or both.

The actuator 300 includes a magnetic cup formed from the base magnetic plate 304a and a sidewall magnetic plate 304b. Both the base magnetic plate 304a and the sidewall magnetic plate 304b can be circular, e.g., along the X-Y plane, to form the magnetic cup. In some implementations, the base magnetic plate 304a and the sidewall magnetic plate 304b can have another shape, such as a rectangular, e.g., square, shape. In some examples, the sidewall magnetic plate 304b can include multiple discrete elements. For instance, the sidewall magnetic plate 304b can include four sidewall elements, one connected to each side of the base magnetic plate 304a, e.g., along a surface defined by the X- and Y-axes.

The base magnetic plate 304a and the sidewall magnetic plate 304b are mechanically coupled (e.g., rigidly adhered to one another). In some examples, the base magnetic plate 304a and the sidewall magnetic plate 304b can be a unitary piece.

The base magnetic plate 304a includes a planar outer surface 306 that extends to an edge surface 308 of the base magnetic plate 304a, which is flush with an outer surface 314 of the sidewall magnetic plate 304b. The edge surface 308 of planar outer surface 306 includes one or more joint elements 310 that provide a structured surface for the base magnetic plate 304a to attach to the suspension 302. For instance, as illustrated in FIG. 3A, the joint elements 310 may be rabbets, in which each joint element 310 is formed from a step-shaped recess that provides a pair of orthogonal surfaces to which surfaces of the suspension 302 are adhered. Generally, the recess of a rabbet has a rectangular shape, e.g., a square shape.

Other recess shapes for the joint elements 310 are also possible. In some examples, the joint elements 310 feature a recess formed from a chamfered, scalloped, or filleted edge in the edge surface 308 of the planar outer surface 306. In each case, the edge of suspension 302 is correspondingly shaped so that the suspension 302 can be coupled to the base magnetic plate 304a with a joint that is sufficiently strong to endure the rigors of the actuator 300's use.

In some implementations, each of the joint elements 310 has the same recess shape. In some implementations, some of the joint elements 310 have different recess shapes.

Each of the joint elements 310 can have any appropriate depth D1 along the Z-axis. For example, each of the joint elements 310 can have a depth $D_1$ along the Z-axis of 200 microns or less. Generally, $D_1$ is selected so that a bottom surface 312 of the suspension 302 does not extend substantially beyond the planar outer surface 306 of the base magnetic plate 304a in the −z direction. For example, the bottom surface 312 may be flush with the planar outer surface 306 (as shown in FIG. 3A) or may not extend as far as the planar outer surface 306 in the −z direction. By not extending beyond the planar outer surface 306, the overall dimension of the actuator 300 in the z-direction can be reduced. In some embodiments, the depth $D_1$ of some or all of the joint elements 310 is substantially the same as the thickness of suspension 302. $D_1$ can be about 300 microns or less, e.g., 25 microns or less; 200 microns or less; 180 microns or less; 150 microns or less.

Depending on a shape of joint element 310, the depth of the joint element 310 can be the same at different lateral positions (e.g., along the X-axis), or can vary. For example, when the joint element 310 is a rabbet, the depth of the joint element 310 is generally the same. However, for a scalloped edge, the joint elements 310 may have a depth of 200 microns near the edge surface 308 that reduces to a depth of zero microns near the planar outer surface 306.

Generally, the lateral dimension of the joint elements 310 orthogonal to the Z-axis (e.g., along the x-axis as illustrated in FIG. 3A) can be constant or can vary. In some embodiments, the joint elements 310 have a lateral dimension of 200 microns or less.

In some implementations, the actuator 300 includes a single joint element 310. In these implementations, the joint element 310 is a single continuous element along the outside edge of the planar outer surface 306. For example, the joint element 310 may form a continuous rabbet or another edge feature along the outside edge of the planar outer surface 306. The suspension 302 may be a single continuous element or multiple elements when the actuator 300 includes a single joint element.

In some implementations, the actuator 300 includes two or more discrete joint elements 310. For instance, the actuator 300 may include joint elements 310 that are evenly spaced apart around the exterior of the base magnetic plate 304a. In these implementations, each of the joint elements 310 may connect with a different suspension 302. Each of the discrete joint elements 310 may connect with a single suspension 302, e.g., when the single suspension 302 includes two or more components that each extend into one of the discrete joint elements 310. Each of the discrete joint elements 310 may connect with a different suspension 302.

As noted above, the suspension 302 connects to the base magnetic plate 304a using the joint elements 310. The suspension 302 may be secured to the base magnetic plate 304a at each of the joint elements 310. For instance, the suspension 302 may be welded to the base magnetic plate 304a at each of the joint elements 310. In some examples, the suspension 302 may be connected to the base magnetic plate 304a using a magnet glue solution at each of the joint elements 310. In some implementations, the suspension 302 may secure to the base magnetic plate 304a using force, e.g., applied to the edge surface 308 by the suspension 302. For instance, when the joint elements 310 are positioned higher on the base magnetic plate 304a along the Z-axis in FIG. 3A, and material of the base magnetic plate 304a were not removed at the bottom limit of the base magnetic plate 304a, the suspension 302 could clip into the joint elements 310 to secure the suspension 302 to the base magnetic plate 304a. During manufacturing of the actuator 300, a manufacturing system could stretch or deform the suspension 302 to position the suspension 302 in the joint elements 310 and above a lip formed by the bottom limit of the base magnetic plate 304a.

In some implementations, the suspension 302 and base magnetic plate 304a may be connected during a manufacturing process for the actuator 300. For instance, a portion of the suspension 302 may be formed within the base magnetic plate 304a, at each of the joint elements 310, during manufacturing. In some examples, the portion of the suspension 302 may be formed within the base magnetic plate 304a using a deposition process, a three-dimensional printing process, or another appropriate process.

In some implementations, one or more of the joint elements 310 may be located at a different position of the base magnetic plate 304a along the Z-axis, displaced from the planar outer surface 306 and toward a magnet 316. For example, some or all of the joint elements 310 may be displaced away from the planar outer surface 306 such that an end of the suspension 302 that contacts the joint element 310 is surrounded by the base magnetic plate on at least three sides, e.g., the top, bottom, and center-most portion of the suspension 302 closest to the magnet 316.

The magnet 316 is positioned in a bottom of the magnetic cup, i.e., on a surface of the base magnetic plate 304a opposite the planar outer surface. The magnet 316 is mechanically attached to the base magnetic plate 304a, e.g., to allow the magnet 316 and the base magnetic plate 304a to form part of a magnetic circuit. The actuator 300 uses the magnetic circuit to generate a force that displaces the coupling plate 320, and a panel attached to the actuator, to generate sound or haptic feedback or both.

The suspension 302 may be manufactured from a magnetic material, e.g., to allow the suspension 302 to form part of the magnetic circuit that includes the base magnetic plate 304a, the sidewall magnetic plate 304b, the magnet 316, and a voice coil 318. The magnetic circuit may optionally include a top magnetic plate 304c, e.g., in implementations of the actuator 300 that include the top magnetic plate 304c. The suspension 302 may be low carbon steel. The suspension 302 may be cold rolled steel.

The suspension 302 may have a relative permeability (e.g., relative to the permeability of free space: $\mu_r = \mu[N*A^{-2}]/\mu_0[N*A^{-2}]$) greater than one or greater than one hundred, e.g., for all reasonable auxiliary magnetic field strengths, where $N*A^{-2}$ is Newtons per Ampere squared. The suspension 302 may have a relative permeability $\mu_r$ between 100 and 20,000, e.g., inclusive of the boundaries, exclusive of the boundaries, or a combination of both. For instance, the suspension 302 may have a 'linear' relative permeability $\mu_r$ of 529 or greater than or equal to 529. In some examples, the suspension 302 may have a relative permeability $\mu_r$ greater than one thousand.

The suspension 302 may have a Young's modulus between 100 gigapascals and 250 gigapascals. In some examples, the suspension 302 may have a Young's modulus between 150 gigapascals and 200 gigapascals. Either range may include the outer boundaries, exclude the outer boundaries, or both. For instance, the suspension 302 may have a Young's modulus in the range (100, 250] or [100, 250) or [100, 250].

In some implementations, the suspension may be part of a support (not shown). The support may mechanically connect the magnetic cup, e.g., the base magnetic plate 304a and the sidewall magnetic plate 304b, to a coupling plate 320. The coupling plate 320 enables the actuator 300 to connect to a device, such as mobile phone. In some examples, the coupling plate 320 may be part of or connected to a display, e.g., the touch panel display 104. For instance, the coupling plate 320 may be mechanically attached to a display.

The coupling plate 320 mechanically attaches to the voice coil 318. The coupling plate 320 can secure a position of the voice coil 318 relative to the magnetic cup using the support. This may enable the voice coil 318 to form part of the magnetic circuit with the magnetic cup, the magnet 316, and the suspension 302.

The support may include a sidewall (not shown) that secures the suspension 302 to the coupling plate 320. The support may include a single sidewall, e.g., a circular sidewall. The support may include two or more sidewalls, e.g., displaced around the magnetic cup. In implementations that include more than one suspension 302, the support may include a corresponding sidewall for each of the suspensions 302.

The support's sidewall may be manufactured from a material with magnetic properties. For instance, the sidewall may be manufactured from iron, nickel, cobalt, a rare-earth metal alloy, or another material with magnetic properties.

The base magnetic plate 304a, the sidewall magnetic plate 304b, and the top magnetic plate 304c sandwich axially the magnet 316. The base magnetic plate 304a, the sidewall magnetic plate 304b, and the top magnetic plate 304c can be formed from a material or materials that are readily magnetized in the presence of an external magnetic field. Such materials may have a high magnetic permeability. For instance, one or more of the plates 304a-c may be manufactured from iron, e.g., a soft iron, high-carbon steel, low-carbon steel, vanadium permendur, or a combination of two or more of these.

The actuator 300 includes the magnet 316 separated from the sidewall magnetic plate 304b by an air gap 316. In general, the magnet 316 can be formed from a material that can be permanently magnetized, such as rare earth magnet materials. Some example materials include neodymium iron boron, samarium cobalt, barium ferrite, and strontium ferrite.

The actuator 300 includes the voice coil 318 located in the air gap 316 between the sidewall magnetic plate 304b and the top magnetic plate 304c. The voice coil 318 is mechanically connected, via the coupling plate 320, to a diaphragm, e.g., the touch panel display 104, to generate a constant force to the diaphragm that can excite one of multiple vibrational modes of the diaphragm, e.g., to generate acoustic output, haptic feedback, or both.

The voice coil 318 includes voice coil windings. When a system, e.g., the electronic control module 220, applies a signal, e.g., an alternating current signal, to the voice coil windings, the voice coil 318 generates a force that displaces the actuator 300 back and forth, e.g., along the Z-axis. The displacement of the actuator 300 can excite the diaphragm to cause the diaphragm to generate acoustic output, haptic feedback, or both.

The actuator 300 can be compact. For example, a depth $D_2$ of the actuator 300 along the Z-axis can be 3.5 mm or less. For instance, the depth $D_2$ can be 3 mm or less; or 2 mm or less.

In some implementations, the actuator 300 may include more or fewer elements than those described here. In some examples, the actuator 300 can include multiple magnets, e.g., two magnets. For instance, the actuator 300 can include another magnet on the open side of the top magnetic plate 304c, e.g., with a magnetic field in a direction opposite the direction of the magnetic field for the magnet 316. This may increase the B field in the air gap 316. One of the magnets may be positioned on top of or as part of the sidewall magnetic plate 304b.

FIG. 4 depicts a side view of another actuator 400 with a suspension 402 that extends below a magnetic cup. The magnetic cup is formed from a base magnetic plate 404a and a sidewall 404b. The actuator 400 can include a magnet 406, a top magnetic plate 404c, and a voice coil 408 that is connected to a coupling plate 410.

The suspension 402 may be part of a support (not shown) for the actuator 400 that mechanically connects the magnetic cup to the coupling plate 410. For example, the suspension 402 may connect to a support sidewall (not shown) that is mechanically attached to the coupling plate 410.

The actuator 400 has a depth $D_3$ that is greater than a depth $D_2$ of the actuator 300, e.g., leaving the depth and diameter of the magnetic cup the same. Specifically, the actuator 400's depth $D_3$ is greater than the actuator 300's depth $D_2$ because the suspension 402 is connected to a bottom of the base magnetic plate 404a in FIG. 4 while the suspension 302 of the actuator 300 in FIGS. 3A-3B connects to the joint elements 310 and does not extend past the planar outer surface 306.

Figure 5:
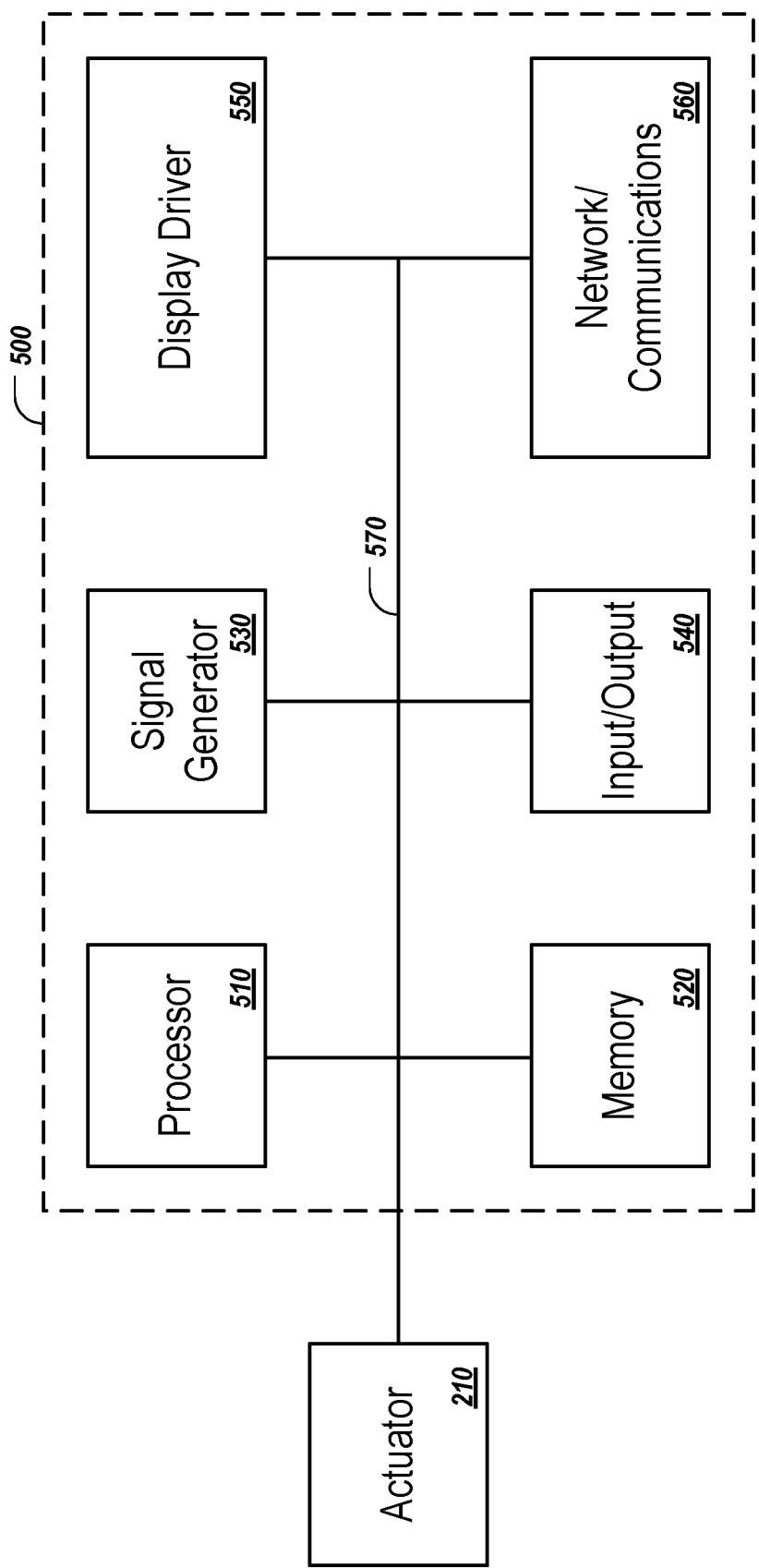
FIG. 5 is a schematic diagram of an embodiment of an electronic control module for a mobile device.

In general, the disclosed actuators are controlled by an electronic control module, e.g., electronic control module 220 in FIG. 2 above. In general, electronic control modules are composed of one or more electronic components that receive input from one or more sensors and/or signal receivers of the mobile phone, process the input, and generate and deliver signal waveforms that cause the actuator 210 to provide a suitable haptic response. Referring to FIG. 5, an exemplary electronic control module 500 of a mobile device, such as mobile device 100, includes a processor 510, memory 520, a display driver 550, a signal generator 530, an input/output (I/O) module 540, and a network/communications module 560. These components are in electrical communication with one another (e.g., via a signal bus 570) and with actuator 210.

Processor 510 may be implemented as any electronic device capable of processing, receiving, or transmitting data or instructions. For example, processor 510 can be a microprocessor, a central processing unit (CPU), an application-specific integrated circuit (ASIC), a digital signal processor (DSP), or combinations of such devices.

Memory 520 has various instructions, computer programs or other data stored thereon. The instructions or computer programs may be configured to perform one or more of the operations or functions described with respect to the mobile device. For example, the instructions may be configured to control or coordinate the operation of the device's display via display driver 550, signal generator 530, one or more components of I/O module 540, one or more communication channels accessible via network/communications module 560, one or more sensors (e.g., biometric sensors, temperature sensors, accelerometers, optical sensors, barometric sensors, moisture sensors and so on), and/or actuator 210.

Signal generator 530 is configured to produce AC waveforms of varying amplitudes, frequency, and/or pulse profiles suitable for actuator 210 and producing acoustic and/or haptic responses via the actuator. Although depicted as a separate component, in some embodiments, signal generator 530 can be part of processor 510. In some embodiments, signal generator 530 may include an amplifier.

Memory 520 can store electronic data that can be used by the mobile device. For example, memory 520 can store electrical data or content such as, for example, audio and video files, documents and applications, device settings and user preferences, timing and control signals or data for the various modules, data structures or databases, and so on. Memory 520 may also store instructions for recreating the various types of waveforms that may be used by signal generator 530 to generate signals for actuator 210. Memory 520 may be any type of memory such as, for example, random access memory, read-only memory, Flash memory, removable memory, or other types of storage elements, or combinations of such devices.

As briefly discussed above, electronic control module 500 may include various input and output components represented in FIG. 5 as I/O module 540. Although the components of I/O module 540 are represented as a single item in FIG. 5, the mobile device may include a number of different input components, including buttons, microphones, switches, and dials for accepting user input. In some embodiments, the components of I/O module 540 may include one or more touch sensor and/or force sensors. For example, the mobile device's display may include one or more touch sensors and/or one or more force sensors that enable a user to provide input to the mobile device.

Each of the components of I/O module 540 may include specialized circuitry for generating signals or data. In some cases, the components may produce or provide feedback for application-specific input that corresponds to a prompt or user interface object presented on the display.

As noted above, network/communications module 560 includes one or more communication channels. These communication channels can include one or more wireless interfaces that provide communications between processor 510 and an external device or other electronic device. In general, the communication channels may be configured to transmit and receive data and/or signals that may be interpreted by instructions executed on processor 510. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 560 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the electronic device 100 to a mobile phone for output on that device and vice versa. Similarly, the network/communications module 560 may be configured to receive input provided on another device to control the mobile device. For example, an audible alert, visual notification, or haptic alert (or instructions therefore) may be transmitted from the external device to the mobile device for presentation.

The actuator technology disclosed herein can be used in panel audio systems, e.g., designed to provide acoustic and/or haptic feedback. The panel may be a display system, for example based on OLED of LCD technology. The panel may be part of a smartphone, tablet computer, or wearable devices (e.g., smartwatch or head-mounted device, such as smart glasses).

Other embodiments are in the following claims.

What is claimed is:

1. An actuator comprising:
 a magnetic cup comprising a base and sidewalls defining a cavity, the base comprising a planar outer surface opposite the cavity, an edge of the outer surface comprising one or more joint elements;
 a magnet arranged in the cavity of the magnetic cup and separated from the sidewalls by an air gap;
 a voice coil arranged in the air gap separating the sidewalls of the magnetic cup and the magnet;
 a support comprising one or more magnetic suspension members each comprising an edge shaped to fit to a corresponding one of the one or more joint elements to connect the support to the magnetic cup, each of the one or more magnetic suspension members having a first side that is a) flush with the planar outer surface of the magnetic cup or b) displaced from the planar outer surface of the base of the magnetic cup along a first axis perpendicular to the planar outer surface in a direction toward the cavity of the magnetic cup; and
 a coupling plate attached to the voice coil and the support.

2. The actuator of claim 1, wherein the magnetic cup has a depth along the first axis of 3.5 millimeters or less.

3. The actuator of claim 1, wherein each of the joint elements has a depth along the first axis of 200 microns or less.

4. The actuator of claim 3, wherein each of the joint elements has a dimension orthogonal to the first axis of 200 microns or less.

5. The actuator of claim 1, wherein the joint elements are rabbets.

6. The actuator of claim 5, wherein each of the rabbets have a rectangular shape or a square shape.

7. The actuator of claim 1, wherein each of the joint elements are a chamfered edge, a scalloped edge, or a filleted edge.

8. The actuator of claim 1, wherein the one or more joint elements comprises a single continuous edge feature along the edge of the planar outer surface of the base of the magnetic cup.

9. The actuator of claim 1, wherein the one or more joint elements comprise two or more discrete joint elements.

10. The actuator of claim 1, wherein each of the one or more magnetic suspension members is welded to the magnetic cup at the corresponding joint element.

11. The actuator of claim 1, wherein each of the one or more magnetic suspension members has a relative permeability between 100 and 20,000.

12. The actuator of claim 1, wherein each of the one or more magnetic suspension members has a Young's modulus between 100 gigapascals and 250 gigapascals.

13. The actuator of claim 1, wherein each of the one or more magnetic suspension members is low carbon steel.

14. The actuator of claim 1, wherein each of the one or more magnetic suspension members is cold rolled steel.

15. The actuator of claim 1, wherein the support comprises a support sidewall that connects the one or more magnetic suspension members to the coupling plate.

16. The actuator of claim 15, wherein the support sidewall is a material with magnetic properties.

17. The actuator of claim 16, wherein the support sidewall is iron.

18. The actuator of claim 1, wherein the magnet cup is a soft magnetic material.

19. A mobile device comprising:
an electronic display panel extending in a plane;
a chassis attached to the electronic display panel and defining a space between a back panel of the chassis and the electronic display panel;
an electronic control module housed in the space, the electronic control module comprising a processor; and
an actuator housed in the space and attached to a surface of the electronic display panel, the actuator comprising:
a magnetic cup comprising a base and sidewalls defining a cavity, the base comprising a planar outer surface opposite the cavity, an edge of the outer surface comprising one or more joint elements;
a magnet arranged in the cavity of the magnetic cup and separated from the sidewalls by an air gap;
a voice coil arranged in the air gap separating the sidewalls of the magnetic cup and the magnet;
a support comprising one or more magnetic suspension members each comprising an edge shaped to fit to a corresponding one of the one or more joint elements to connect the support to the magnetic cup, each of the one or more magnetic suspension members having a first side that is a) flush with the planar outer surface of the magnetic cup or b) displaced from the planar outer surface of the base of the magnetic cup along a first axis perpendicular to the planar outer surface in a direction toward the cavity of the magnetic cup; and
a coupling plate attached to the voice coil and the support.

20. A wearable device comprising:
an electronic display panel extending in a plane;
a chassis attached to the electronic display panel and defining a space between a back panel of the chassis and the electronic display panel;
an electronic control module housed in the space, the electronic control module comprising a processor; and
an actuator housed in the space and attached to a surface of the electronic display panel, the actuator comprising:
a magnetic cup comprising a base and sidewalls defining a cavity, the base comprising a planar outer surface opposite the cavity, an edge of the outer surface comprising one or more joint elements;
a magnet arranged in the cavity of the magnetic cup and separated from the sidewalls by an air gap;
a voice coil arranged in the air gap separating the sidewalls of the magnetic cup and the magnet;
a support comprising one or more magnetic suspension members each comprising an edge shaped to fit to a corresponding one of the one or more joint elements to connect the support to the magnetic cup, each of the one or more magnetic suspension members having a first side that is a) flush with the planar outer surface of the magnetic cup or b) displaced from the planar outer surface of the base of the magnetic cup along a first axis perpendicular to the planar outer surface in a direction toward the cavity of the magnetic cup; and
a coupling plate attached to the voice coil and the support.

* * * * *